Figures 1, 2:
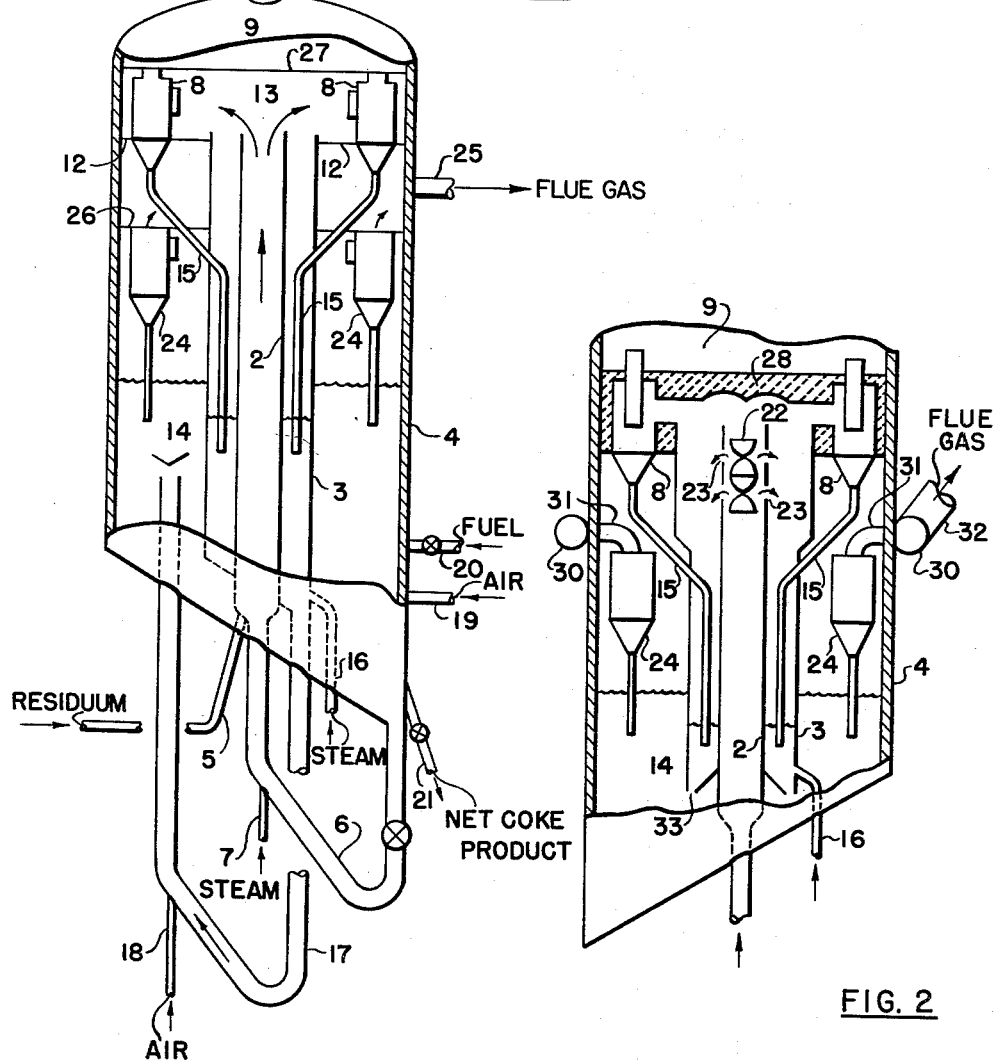

Nov. 7, 1961 D. W. WOOD ET AL 3,007,778
SINGLE VESSEL FLUID COKER AND BURNER
Filed Nov. 17, 1954

Donald W. Wood
Daniel S. Maisel Inventors

By *Small, Dunham & Thomas*
Attorney

United States Patent Office 3,007,778
Patented Nov. 7, 1961

3,007,778
SINGLE VESSEL FLUID COKER AND BURNER
Donald W. Wood, Highland Park, and Daniel S. Maisel, Union, N.J., assignors to Esso Research and Engineering Company, a corporation of Delaware
Filed Nov. 17, 1954, Ser. No. 469,344
5 Claims. (Cl. 23—284)

This invention relates generally to the conversion of hydrocarbon oils in a fluidized solids system. More particularly, this invention is concerned with a high temperature pyrolytic conversion process and apparatus for producing low molecular weight hydrocarbons suitable for use as chemicals and chemical intermediates from low value residual oils. A paramount feature of this invention is that the conversion is accomplished in a single vessel system of unique design using particulate solids as a heat transferring medium.

Charging stocks suitable for use in the present invention comprises, preferably, petroleum residua containing refractory constituents and catalyst contaminants that render other conversion methods unattractive. Such a low value residual oil is characterized by an API gravity between $-10°$ and $20°$, a Conradson carbon between 5 and 50 wt. percent and an initial boiling point between $850°$ and $1200°$ F. Broadly, however, the present invention may find application in the conversion of charging stocks comprising shale oils, asphalts, tars, pitches, coal tars, synthetic oils, cycle stocks extracts, recycled heavy ends from the conversion products, whole crudes, heavy distillate or residual fractions therefrom, etc., or mixtures thereof.

The coking temperatures used in the present invention can be in the range of $1200°$ to $1800°$ F., with temperatures in the range of $1300°$ to $1500°$ F. being preferred. This invention specifically pertains to the attainment of low reaction times, at least for the primary or initial reaction products, to avoid undue degradation of the products by condensation, polymerization, etc. In the preferred coking temperature range, the reaction times for the primary reaction products before they are quenched are preferably in the range of 0.1 to 1.0 second, although in certain applications and with some feed stocks the reaction times may be in the range of 0.1 to 10 seconds.

The heat-carrying particulate solids that are used in the present invention may comprise any suitable, finely divided, preferably substantially catalytically inert, refractory solid such as metal or glass beads, sand, ceramics, spent catalyst, pumice, etc. Preferably, however, coke particles produced by the process are the solids used. References herein to coke particles will, however, be understood to be by way of illustration only and to be non-limiting. In special cases, using selected feed stocks, it may be desirable to use solids displaying catalytic qualities, such as activated carbon particles, and this invention is inclusive of the use of such solids.

As this is a fluidized solids process, the coke particles have, preferably, a size in the range of 40 to 500 microns by screen analysis, although the size in some applications may vary considerably beyond this range, e.g., from 10 to 1000 microns or more.

In the practice of this invention it is preferred to partially burn the circulating coke particles to maintain the heat balance in the system. During this burning, the temperature of the coke is raised $50°$ to $400°$ F. above the coking or reactor temperature. A situation may obtain, however, where the value of other fuels may be less than that of the coke produced by the process. In such cases, other extraneous liquid and gases may be preferentially combusted to supply heat to the process.

Normally, the high temperature coking of oils for the production of chemicals using fluidized solids consists of three basic steps; namely, initial conversion of the oil followed by rapid separation of the solids from, and quenching of, the primary conversion products; heat soaking and/or stripping of the separated solids to dry them and to produce long time conversion products from any residue deposited on the solids; and heating of the solids, usually by partial combustion. It is an object of this invention to devise a novel single vessel system for carrying out these steps.

While this invention is particularly adapted to the high temperature coking of hydrocarbons oils, it may have utility in other fluidized solids processes, either catalytic or non-catalytic, such as fluid hydroforming, wherein these three steps occur, i.e., initial contacting of the solids with a charging stock, stripping and/or soaking of the solids, and heating and/or regeneration of the solids.

In brief compass this invention proposes a pyrolytic hydrocarbon conversion process which comprises the steps of contacting a charging stock in a vertically disposed transfer line conversion zone with particulate solids maintained at a conversion temperature to form gasiform conversion products and residue which is deposited on the solids, the particulate solids and reactants being conveyed upwardly through the conversion zone at velocities above 5 ft./sec., removing solids from the conversion products in a disengaging zone above the conversion zone and passing the solids so removed to a soaking and stripping zone, the soaking zone being contiguously and annularly disposed to the conversion zone and in fluid communication with the disengaging zone, holding solids resident in the soaking zone for a time and at a coking temperature sufficient to dry the solids and to convert the residue to coke with the generation of further amounts of conversion products, removing and quenching the conversion products from the disengaging zone, passing solids from the soaking zone to a heating zone wherein the solids are reheated to a temperature $50°$ to $400°$ F. above the conversion temperature, the heating zone being contiguously and annularly disposed to the soaking zone but separated from the disengaging zone whereby heat energy is transferred by conduction between the zones, and passing reheated solids from the heating zone to the conversion zone.

In a preferred embodiment of the invention, the particulate solids are reheated by partially burning the solids in the heating zone, the flue gases therefrom being withdrawn after having entrained solids removed.

This invention is also concerned with apparatus for the above high temperature coking process which comprises, in combination, a housing having a substantially horizontal partition in the upper portion thereof forming upper and lower chambers; two concentric vertically disposed conduits centrally located within the housing extending upwardly through the partition and in open communication with the upper chamber, the concentric conduits forming an inner transfer line coking zone, and an outer fluidized solids soaking zone, and forming with the housing a fluidized solids burning zone; a plurality of cyclonic separators spaced about the circumference of the concentric conduits, supported by said partition and disposed within the upper chamber, the cyclonic separators being adapted to receive gasiform solid-particle-containing streams from the upper chamber, and to discharge separated solids into the fluidized solids soaking zone; conduit means adapted to withdraw gaseous material from the cyclonic separators; conduit means for circulating particulate solids from the fluidized solids burning zone to the transfer line coking zone and from the fluidized solids soaking zone to the fluidized solids burning zone; and conduit means for introducing charging stock into the transfer line coking zone, for introducing a stripping gas into the lower portion of the fluidized solids soaking zone, and for introducing a free oxygen containing gas into the lower portion of the fluidized solids burning zone.

The particular arrangement of cyclonic separators, and support thereof in the apparatus of the present invention results not only in the rapid separation of the contact solids from the conversion products to permit rapid quenching of the products, but also minimizes piping and manifold costs because of the integration of the processing steps in one vessel, and permits operation of the apparatus although holes may be eroded in one or more of the cyclonic separators.

This invention will become clear during the following description of the drawings attached to and forming a part of this specification. FIGURE 1 of the drawings illustrates the basic form of the apparatus, and FIGURE 2 depicts certain modifications thereof.

Referring now to FIGURE 1, there is shown a transfer line reactor 2 having an annular soaking zone 3 enclosed in larger vessel or housing 4. The reactor 2 is a vertical conduit of relatively narrow cross-section, and has preferably a length to diameter ratio in the range of 3 to 15, e.g. 9. A charging stock to be converted, e.g. a vacuum residuum, is injected into the base of the reactor via line 5 wherein it contacts hot solids, e.g. coke, circulated to the reactor by line 6. As a control feature, the feed can be introduced into the transfer line reactor at various points along its length. Thus, when operating at high temperatures with relatively short contact times, the contents of line 5 can be introduced by one or more lines into the upper portions of reactor 2. The charging stock can, of course, be suitably dispersed or atomized as by steam. Steam or other diluent and conveying gas is admitted to the reactor by line 7. The solids and the reactants are conveyed upwardly through the reactor at velocities above 5 ft./sec., e.g. 60 ft./sec., while the injected oil undergoes pyrolysis. After a contact time within the limits of 0.1 to 1.0 sec., the solids are removed from the conversion products by a plurality of cyclonic separators 8, disposed around the circumference of the reactor, only two of which are shown.

The conversion products, now substantially solid free, are discharged into the chamber 9 in the upper part of vessel 4 from which they are removed by line 10 to conventional separating processes to obtain the various chemicals desired. It is preferred to immediately quench the conversion products after the contact solids are removed and this is accomplished by injecting via line 11 a quench medium into the conversion products sufficient to cool them to a temperature below about 700° F. This quench medium comprises, preferably, heavy petroleum oils, such as a recycled fraction separated from the conversion products, but may include other liquids such as water, or gases, such as light hydrocarbon gases or steam, or cool solids, such as particulate coke.

It is to be noted that the cyclonic separators 8 are supported by a partition or plate 12 that serves also to isolate the solids disengaging zone 13 from the solids heating zone 14, described hereinafter. Thus, if holes be eroded in one or more of the separators, the products are are not lost to the solids heating zone. The disengaging zone is separated from the products withdrawal chamber 9 by plate 27. It is to be appreciated, however, that conduits can be used to connect each cyclonic separator directly with outlet conduit 10 to further decrease vapor holding time.

In the arrangement shown, the whole of the internal equipment is supported by or suspended from partition 12 in the top of the reactor. This design permits differences in thermal expansion and contraction of the various parts of the apparatus. The various lines leading into the reactor, e.g. lines 5, 6, 16 and 17, and connected to the internal conduits are suitably fitted with expansion joints, slip joints, bellows joints, etc., whereby any differences in expansion of the parts of the vessel are accounted for. Partition 26 is suitably designed to permit relative motion between housing 4 and conduit 3, it being apparent that partition 26 need not form a perfectly gas tight seal.

This invention is particularly adapted to balanced pressure operations at near atmospheric pressures with the differences in levels between the fluid beds and the height of the standpipes being used to maintain the pressure balances. It is applicable with suitable modifications, however, to operations at subatmospheric and superatmospheric pressures, and to operations wherein the pressure between zones is relatively large.

In this illustration, the gases from the transfer line zone and from the soaking zone seek their own path through the cyclones. As is shown in FIGURE 2, however, means may be employed to more positively direct the gas flow. Further, the effluent from the transfer line reactor can be made to discharge directly into each cyclonic separator 8 to decrease residence time by means of a serially branched conduit system or manifold arrangement directly connecting the top portion of the transfer line reactor and the soaking zone to the cyclones.

Depending on the operating conditions, some refractory constituents of the feed may not initially be converted in the transfer line zone and will deposit on the contact solids. To convert this residue material, in cases where it is necessary, and to strip the solids of occluded gases, the solids from cyclonic separators 8 are transferred to the soaking zone via diplegs 15 wherein they are held resident for 1 to 20 secs., at a coking temperature in the range of 1200° to 1800° F., sufficient to convert the residue to coke and other conversion products and to dry the solids. A stripping gas, e.g. steam, is admitted by one or more lines 16 to aid in drying and stripping and to fluidize the solids. This stripping gas is suitable distributed around the base of stripper as by a distributing ring. The gases from the soaking zone pass upwardly into the solids disengaging zone 13. Thus, only one system of cyclones is used to remove solids from the gases and conversion products, whereas in the past it has been customary to use a separate cyclone system to handle the gases from the soaking zone.

In order to supply heat to the process, solids are circulated from the soaking zone to the solids heating zone 14 via standpipe and riser system 17, which can be any one of several types of solid circulating systems known by the art. As illustrated, a "J-bend" system is used and is preferred as relatively coarse solids are used. Air or other free oxygen containing gas is injected through conduit 18 into the riser side of conduit 17 to transport the solids, and to fluidize and burn the solids in zone 14. Additional air, if desired, can be admitted to zone 14, as by line 19. The distribution of the air throughout the fluidized bed may be facilitated by suitable means, as by distributing rings, packing, baffles, etc. After being reheated, the solids are circulated to the transfer line reactor zone 2 via line 6.

Where coke particles are used as the heat carrying medium, it may be desired to maximize the amount of coke produced by the process. Extraneous liquid or gaseous fuels can be injected into zone 14 via line 20 to accomplish this, or to make up any heat deficiencies in cases wherein the coke produced by the process is not sufficient to meet heat requirements. Normally, however, a net amount of coke will be produced and this is withdrawn by line 21 as product.

Flue gases are discharged from zone 14 via line 25, after having entrained solids removed by cyclonic separators 24. As shown, these separators are supported by plate 26, which need not be gas tight, and the flue gases pass from the separators into the chamber formed by the plate before passing through line 25.

The following Table I summarizes the pertinent processing variables and apparatus proportions applicable to the present invention as depicted by FIGURE 1 and presents an example thereof:

Table I

|  | Range | Example |
|---|---|---|
| Conversion temperature, °F | 1,200 to 1,800 | 1,300 |
| Soaking temperature, °F | 1,200 to 1,800 | 1,300 |
| Combustion temperature, °F | 1,250 to 2,100 | 1,500 |
| Initial $C_3^*$ conversion in transfer line, wt. percent | 20 to 50 | 36 |
| Ultimate $C_3^*$ conversion, wt. percent (not including recycle operation) | 20 to 75 | 40 |
| Solids/oil ratio in transfer line, wt./wt | 10 to 150 | 21 |
| Steam rate to transfer line, wt. percent fresh feed | 1 to 300 | 3 |
| Solids velocity in transfer line, ft./sec | 5 to 80 | 48 |
| Vapor velocity in transfer line, ft./sec | 5 to 100 | 60 |
| Solids loading in transfer line, lbs./ft.³ | 0.1 to 30 | 2.0 |
| Superficial gas velocity in soaking and heating zones, ft./sec | 0.2 to 5 | 1 |
| Solids residence time in soaking zone, average, secs | 1 to 20 | 12 |
| Hydrocarbon partial pressure at products outlet, p.s.i. | 4 to 50 | 20 |
| Diameter of transfer line reactor, ft | -------- | 4 |
| L/D (length/diameter) ratio of transfer line reactor | 3 to 15 | 3 |
| Diameter of soaking zone, percent of diameter of transfer line reactor | 150 to 200 | 150 |
| Diameter of heating zone, percent of diameter of transfer line reactor | 250 to 700 | 500 |

*$C_3$ conversion is defined as: 100 times wt. percent of $C_3$ and lighter hydrocarbons divided by 100 wt. percent fresh feed less wt. percent coke.

With reference to FIGURE 2, certain modifications of this invention will be described. Parts similar to those shown in FIGURE 1 have the same numerical designation. In order to minimize the duty of cyclonic separators 8, additional solid-gas separating means of simple design can be employed. For example, spiral vanes or impellers 22 are inserted in the upper portion of the transfer line reactor to give the solids-gas stream a rotational motion, thereby forcing the heavier solids to the outside of the conduit. Suitable slots or openings 23 are made in the reactor wall to permit the solids to fall into the soaking zone. Further, the upper portion of the soaking zone may be suitably enlarged as shown to decrease gas velocities in this area.

In conjunction with the above modification or separate therefrom, the solids-gas disengaging zone can be suitably packed, baffled, etc., with filling 28 as shown, to eliminate dead spaces and to cause rapid change of direction of the gas streams thereby forcing solids into the soaking zone. By proper choice of refractory materials and design, the surfaces receiving the direct impact of the gas stream from the transfer line zone can be made to give good service considering the extreme conditions of temperature and erosion encountered. By thus ensuring the more direct passageway of the conversion product to the cyclone separators 8, vapor holding times are further decreased.

Instead of using a partition 26 as illustrated in FIGURE 1, the flue gases from the burning zone may be collected in an annular collection ring or manifold 30. Connecting lines 31 are used in this modification to introduce the flue gases into the collection ring from each of the separators 24. The flue gases are then removed from the collection ring by line 32.

In another modification of the apparatus, the conduits conveying solids from the soaking zone to the heating zone may be eliminated. Instead, the lower portion of the soaking zone 3 may be in direct fluid communication with the heating zone 14 as shown in FIGURE 2 such that the solids fall or gravitate from the stripping zone into the heating zone after a sufficient resident time in the soaking zone. The difference in levels between the fluid beds are controlled in this arrangement to provide an effective seal between the zones and to regulate the flow of the solids. The opening 33 connecting the zones may conveniently be made variable and a gas, e.g. steam, may be introduced at controlled velocities upwardly into the openings as further control aids.

From the above description, it can be seen that this invention considerably simplifies the customary high temperature chemicals coking process which previously has required as many as three or four separate vessels and considerable conduit for transporting the contact solid.

Having described the invention, what is sought to be protected by Letters Patent is succinctly set forth in the following claims.

What is claimed is:

1. Apparatus for the high temperature coking of hydrocarbon charging stocks which comprises, in combination: a housing having a substantially horizontal partition in the upper portion thereof forming upper and lower chambers; two concentric vertically disposed conduits centrally located within said housing extending upwardly through said partition above the uppermost portion of said lower chamber and in open communication with said upper chamber, said concentric conduits forming an inner transfer line coking zone and an outer fluidized solids soaking zone, and forming with said housing a fluidized solids burning zone; a plurality of cyclonic separators disposed about said concentric conduits and disposed within said lower portion above the fluidized solids bed therein, said last mentioned cyclonic separators being adapted to receive flue gases carrying entrained solids from said fluidized solids burning zone and to discharge separated solids thereto; conduit means for withdrawing flue gases from said last mentioned cyclonic separators; a plurality of cyclonic separators spaced about the circumference of said concentric conduits, supported by said partition and disposed within said upper chamber, said cyclonic separators being adapted to receive gasiform solid-particle-containing streams from said upper chamber and to discharge separated solids into said fluidized solids soaking zone; conduit means adapted to withdraw gaseous material from said cyclonic separators; conduit means for circulating particulate solids from said fluidized solids burning zone to said transfer line coking zone and from said fluidized solids soaking zone to said fluidized solids burning zone; and conduit means for introducing a charging stock into said transfer line coking zone, for introducing a stripping gas into the lower portion of said fluidized solids soaking zone, and for introducing a free-oxygen containing gas into the lower portion of said fluidized solids burning zone.

2. Apparatus of claim 1 wherein the void spaces in said upper chamber are filled to cause the effluent from said transfer line coking zone to issue directly into said cyclonic separators.

3. The apparatus of claim 1 comprising in addition thereto solid-gas separating means located in the upper end portion of said transfer line reactor zone adapted to force solids into said fluidized solids soaking zone while permitting relatively free passage of gases to said upper chamber.

4. Apparatus for the conversion of hydrocarbon oils comprising, in combination, a unitary vessel having a high temperature combustion chamber in its lower portion and a separate vapor-solids separation chamber in its upper portion, a partition between said chambers to prevent substantial mixture of gasiform products from the respective chambers, an elongated upflow reaction chamber extending within said unitary vessel through said partition from a lower part of the combustion chamber to said upper separation chamber and terminating above the uppermost portion of said combustion chamber, said elongated reaction chamber being adapted to receive a stream of finely divided solids from the combustion chamber and carry them to the separation chamber, an outlet from the separation chamber for gasiform reaction products, an elongated conduit adapted to return separated solids from the separation chamber downwardly through said partition beside the upflowing reaction chamber and to the combustion chamber, means for passing a stripping fluid upwardly through said conduit in counterflow to said solids and into said separation zone, and a separate outlet in the combustion zone and below said partition for combustion gases produced therein.

5. In apparatus of the character described, adapted to contact hydrocarbon oil with finely divided solid particles the combination in a unitary vessel structure of a combustion chamber in a lower portion and a separation chamber in an upper portion of said vessel, a partition between and completely separating said chambers except for conduit means hereinafter described, an outlet in the separation chamber for gasiform reaction products, an annular conduit adapted to return separated solids from said separation chamber and passing them downwardly through said partition to said combustion chamber, means for supporting a mass of fluidized solids in said combustion chamber, means for supplying combustion supporting gas to said chamber, an outlet from said chamber and below said partition for combustion gases produced in said chamber, an elongated upflow reactor conduit within said annular conduit and extending through said partition conduit above the uppermost area of said combustion chamber, said upflow reaction conduit being adapted to flow a gaseous suspension of hot solid particles upwardly therethrough, conduit means for supplying hydrocarbon feed to said reaction conduit to contact said upflowing suspended solids to be converted by reason of such contact, whereby the vapors of such oil assist in carrying the solids upwardly, and means for preventing substantial mixture of said air and said hydrocarbon feed.

References Cited in the file of this patent

UNITED STATES PATENTS

| | | |
|---|---|---|
| 2,445,328 | Keith | July 20, 1948 |
| 2,514,288 | Nicholson | July 4, 1950 |
| 2,525,925 | Marshall | Oct. 17, 1950 |
| 2,687,992 | Leffer | Aug. 31, 1954 |
| 2,698,281 | Leffer | Dec. 28, 1954 |